Figures 1, 2, 3:
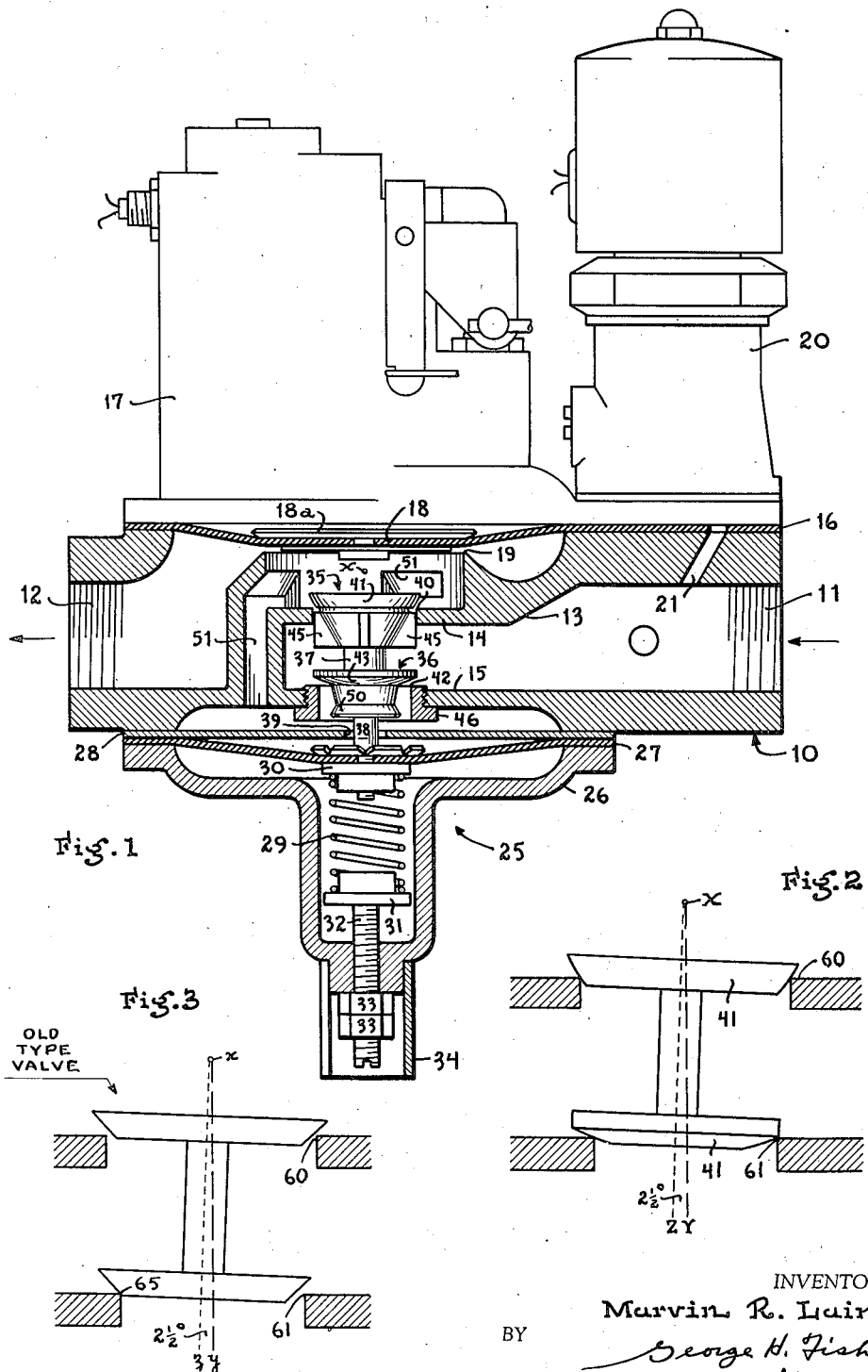

April 25, 1944.    M. R. LAING    2,347,351
VALVE
Filed June 20, 1941    2 Sheets-Sheet 1

OLD TYPE VALVE

INVENTOR.
Marvin R. Laing
BY George H. Fisher
Attorney

April 25, 1944. M. R. LAING 2,347,351
VALVE
Filed June 20, 1941 2 Sheets-Sheet 2

INVENTOR.
Marvin R. Laing
BY George H. Fisher
Attorney

Patented Apr. 25, 1944

2,347,351

UNITED STATES PATENT OFFICE 2,347,351

VALVE

Marvin R. Laing, Minneapolis, Minn., assignor to Mineapolis-Honeywell Regulator Company, Minneapolis, Minn., a corporation of Delaware Application June 20, 1941, Serial No. 398,964

13 Claims. (Cl. 251—81)

The present invention relates to valves. More particularly, the present structure involves certain desirable features in balanced valve design whereby accurate seating of the valve is assured whether or not the valve is in true axial alignment with the seat.

Present known valve structures of the type to which the present design appertains are very often rendered exceedingly insensitive to control pressure due to tipping of the valves. Such tipping may be caused by off-center stretching of the diaphragm in assembly operations, ageing of the diaphragm whereby stretching of one part or another exceeds that in other parts, the velocity pressure on the valve parts, reaction pressures created by the fluid passing through the valve, spring buckling, and many other factors. With the conventional wide valve seat facing, this tipping causes the valve to present an elliptical surface to the valve port and seat so that one side of the valve engages the seat while the other side forms a deep peripheral crack through which the fluid will pass at a fast rate. The increased velocity of the fluid reduces the pressure as a result of a Venturi effect adjacent the valve whereupon the valve will be urged suddenly to closed position with an accompanying hammerlike blow. After this action the pressure up and downstream of the valve more closely equalizes and the valve reopens. However, the valve will again close suddenly with another hammerlike blow. Such action results in noisy operation, inaccurate regulation of flow, and quick deterioration of the valve parts.

Still another difficulty present in existing balanced valves caused by tipping is the sluggishness of action in the minimum operation range caused by one side of the valve engaging the seat before the other side. When such off-center engagement occurs, the valve must slide down into its seat. Because of friction, this sliding action takes a considerable force with relationship to the force required to modulate the valve once it is in open position. Thus, it is seen that a substantial loss of sensitivity is present in existing valve structures when the valve members become slightly out of alignment with the valve seats.

An object of the present invention is to provide a balanced valve which will seat properly and accurately even though the valves and valve seats are not in exact alignment.

Another object is to provide a valve seat for a valve which will minimize valve noises and fluttering as the result of a Venturi effect.

Still another object is to provide a balanced valve which has a plurality of concentrically spherically formed valve faces cooperable with small area valve seats and guided so that there will be obtained for either valve simultaneous seating for all points which are adjacent the respective valve seats.

Other objects reside in the incorporation of the novel valving means of the preceding objects into a pressure regulating valve mechanism, and into an on and off valve mechanism which responds to a controlled condition.

Still other objects will be in part obvious and in part pointed out in the accompanying specification and claims.

Figure 4:
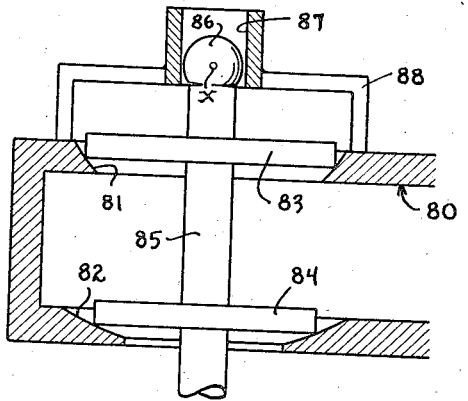
Figure 5:
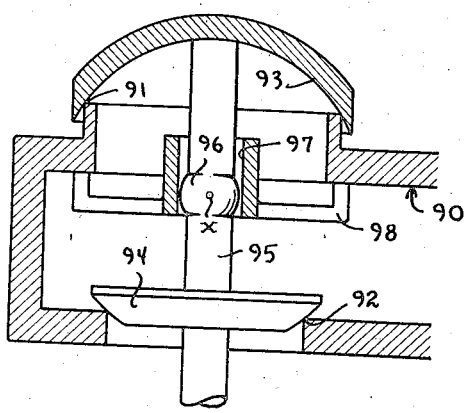

In the drawings:

Fig. 1 shows a detail vertical sectional view of the present invention as applied to and incorporated with an on and off valve, Fig. 2 is an enlarged diagrammatic view, Fig. 3 is an enlarged diagrammatic view, similar to Fig. 2, but showing an old type of structure, and Figs. 4 and 5 illustrate modifications of my invention.

Referring more particularly to the drawings, the valve mechanism comprises a lower valve housing generally indicated by the reference character 10 which has an inlet portion 11 and outlet portion 12 and a partition 13 which separates the inlet side from the outlet side of the valve. The partition 13 is formed into a plurality of webs 14 and 15 to provide a plurality of valve seats to be hereinafter more fully described.

On the upper part of the valve body 10, a diaphragm 16 is secured between a faced off portion of the valve body 10 and an upper valve housing 17. The diaphragm 16 has a stiffened portion 18 in its center backed by a circular plate 18a so that a valve member is defined by this reenforced shape of the center portion of the diaphragm 16. This valve member 18 is arranged to cooperate with a valve port 19.

The upper part of the valve housing 17 is so constructed that it may house certain operating structure which may be of any conventional type and operated in response to certain desired controlling conditions. A means to render the diaphragm valve 18 operative in an on and off manner is shown as a solenoid valve 20. The valve 20 supplies high pressure gas from a port 21 to the chamber above the diaphragm 16 to close the diaphragm valve. To open the diaphragm valve the solenoid valve 20 may be so actuated in response to a control condition that the gas above the diaphragm 16 will be bled off to some suitable vent, not shown.

On the lower portion of the valve body 10, a pressure regulating mechanism 25 is secured. The regulating mechanism 25 comprises a flanged cup 26 which secures a flexible diaphragm 27 and a diverting flange 28 to the lower part of the valve housing 10. A spring 29 at one end engages a shouldered member 30 secured to the diaphragm 27 and engages an adjustable shouldered member 31 at the other of its ends. The shouldered member 31 may be adjusted by an adjustment screw 32 which is held in adjusted position by lock nuts 33. A sleeve 34 slips onto a shoulder of the spring housing to prevent unauthorized tampering with the regulating valve adjustment.

Referring now to the valve structure, a pair of balanced valves 35 and 36 are secured together upon a stem 37. The lower valve 36 is connected to a second stem 38 which extends through a hole 39 in the pressure plate 28 and is secured to the shouldered spring abutment member 30. A valve seat 40 cooperates with a spherically curved surface 41 of the upper valve member 35 and a valve seat 42 cooperates with a curved portion 43 of the lower valve member 36. The valve seats 40 and 42 are made so that there will be a very small valve seat area. In construction these seats are made by drilling the partition 14 and a port plug 45, after which the valve seat edges are merely chamfered. This chamfer is preferably but a slight one being theoretically as small as possible to minimize the Venturi effect. However, for practical purposes, it has been found that the chamfer may be about one sixty-fourth of an inch and still retain good operating characteristics for the valve. The valve members 35 and 36 are lapped into their seats 40 and 42 respectively by moving the stem 38 in varying circles. This operation tends to generate a spherical surface for both the valves and their seats. The upper valve member 35 has guide vanes 45 which are freely slidable through the port for the valve seat 40 with a fit which is close enough so that the valve may be freely slid upwardly and downwardly while allowing for but a minimum of lateral motion of the valve.

The gas in passing the upper valve member 35 passes directly out to the space beneath the valve portion 18 of diaphragm 16 of the on and off valve; the gas passing through the lower valve 36 passes around a deflecting skirt 50, between the port plug member 46 and the gas deflecting flange 28 which prevents impingement of the high velocity gas directly upon the diaphragm 27, and through ducts 51 to the space beneath diaphragm 16.

*Operation*

In the position shown in the drawings, the valve 18 is shown as just moving away from its valve seat 19 which results when high pressure gas is vented from above the diaphragm 16. When such an action takes place, the pressure in the intermediate chamber defined between the pressure regulator valve mechanism and the on and off valve will be substantially reduced. When this pressure is reduced the pressure acting within this intermediate chamber which is transferred through port 39 and acts upon the pressure regulator diaphragm 27 will be likewise reduced whereupon the spring 29 will move the valves 35 and 36 upward. The upward movement of the valves will cause high pressure gas to enter the intermediate chamber and thus force the valve member 18 to its uppermost position. At this time the pressure in the intermediate chamber as well as on the outlet side of the valve 12 will become equalized and will be the pressure at which the burner or other device is operated. As the pressure increases the diaphragm 27 will be urged downwardly which will cause the valves 35 and 36 to be more nearly closed which will result in a reduction in pressure in the downstream side of the valve. As the pressure decreases, the spring 29 will urge the valve members 35 and 36 upwardly to supply more high pressure gas to the downstream side of the valve, thereby raising the pressure. The proper operating position is quickly assumed, however, and the regulator valve mechanism will only move slightly in response to gradual pressure fluctuations.

When the solenoid valve 20 operates so as to supply high pressure gas to the chamber above the diaphragm 16 from the port 21, the valve portion 18 will be moved down toward its seat 19 and the pressure regulating valve members 35 and 36 will likewise be moved down toward their seats because of the reduced flow of gas required. When the valve member 18 engages its seat 19, there will be no further requirement for high pressure gas and the valve members 35 and 36 will then engage their respective seats 40 and 42.

In many instances due to irregular action of the diaphragm 27, or buckling of the spring 29, or the impingement of gas as it flows past the valves 35 and 36, the entire valve assembly will become tilted. The valve members 35 and 36 have their facings 41 and 43 substantially concentrically spherically formed. The curve of formation of these spherical seats may be selected about any desirable point. However, it has been found practicable to keep that point relatively close to the upper surface of the valve member 35. This point is indicated at X on Figs. 1 and 2. It will be noted that by such structure, the curving angle which the valve face 41 presents to its seat is quite acute, but the arc which the curved surface 43 of the valve member 36 presents to the valve seat 42 is quite obtuse. The guide vanes 45 associated with the upper valve member 35 are so arranged with relationship to both of the valve members and the center point that if the valve assembly is tilted, such tilting will take place and the valves will rotate about a point in proximity to this center point. For this reason, it is seen that as the valve members 35 and 36 are moved toward and away from their seats even when tipped, that because of their spherical shape about a common center point, they will still present concentric spherical surfaces to the valve seats. Hence it is seen that the valve may be tilted without seriously affecting its operating characteristics. The extent to which the valve may be tilted may be limited by engagement of the stem 38 with the port 39 in the deflecting plate 28.

Figure 2 illustrates somewhat diagrammatically part of the valve mechanism in a tilted position. The reference character 60 represents the upper valve port and reference character 61 indicates the lower valve port. The normal alignment for the valve is indicated by the dash line XY and the tilted position of the valve is represented by the dotted line XZ. It will be noted from a study of the drawings that the valve is perfectly seated even though the valve is tilted through approximately 2½° which is about the maximum that the valve will be tilted in ordinary structures. However, it will be understood that a larger valve may be constructed upon the concentric spherical principle of valve facings if it is probable that the valve may be tilted through a greater angle than that shown.

Fig. 3 shows an old type valve tilted through an angle similar to the tilting of the valve shown in Fig. 2. It will be noted that the lower valve has engaged the valve seat 61 at the point 65 inasmuch as these conical type valves present an elliptical surface to the valve seat. When such valves are tilted there will be a crack running substantially all the way around the valve that is engaged. It is also seen, upon consideration of Fig. 3, that the upper valve member is opened entirely around it because of the engagement of the lower valve at the point 65 with the valve seat 61. Hence it is obvious, that in order for this old type valve to be completely closed, the pressure motor must slide the lower valve along its valve seat until the valve mechanism has straightened up along the dash line $xy$. This sliding results in a jumpy valve action as well as substantially reducing the valve's accuracy because of friction. Such straightening up of the valve from the dotted line $xz$ to the position it will assume around the dash center line $xy$ also will cause a stress in the diaphragm, or spring, or in whatever portion of the structure which may have caused the valve to tilt out of alignment with the valve seats.

Having described the preferred practicable form of my invention, I will now describe those modifications shown in Figs. 4 and 5. Generally, each of these figures illustrate forms of my invention wherein the valve members are guided so that they will be rotated exactly about the center of curvature thereof. Fig. 4 discloses a modification wherein the valve seats are concentrically curved about a guide center point, and Fig. 5 illustrates a modification wherein the valve member facings are curved, and the valve members are guided about the point of center of the curvature thereof.

Referring more particularly to Fig. 4, the interior valve web of a valve is generally indicated by the reference character 80. The web 80 has an upper valve facing 81 and a lower valve facing 82. The valve facings 81 and 82 are curved about the center point X. A first valve member 83 cooperates with the upper valve facing 81 to valve a fluid and a lower valve member 84 cooperates with the lower valve facing 82 to also valve the fluid. The valve members 83 and 84 are rigidly connected together by a valve stem 85 which may extend down to a regulator diaphragm, not shown. At its upper extremity the valve stem 85 has a spherically shaped enlarged knob 86. The knob 86 is confined slidably in a guide sleeve 87 which is secured to the valve web 80 by a spider 88.

The knob 86 is curved about the same center of curvature as the center of curvature of the valve facings 81 and 82. Hence as the valves 83 and 84 are tilted sideways from the vertical position, the movement of the valve will be around the center point X. Because of the spherical configuration of the valve facings 81 and 82, any tilting of the valve will not vary the seating characteristics of the valve members 83 and 84 upon the valve facings 81 and 82 respectively. Therefore, it is seen that with the valve facings on the seats concentrically spherically curved that an action identical to the action of that form shown in Fig. 1 is obtained.

The modification shown in Fig. 5 illustrates a structure wherein the center of curvature of the valve members is selected at a point between the members. The valve web generally indicated by the reference character 90 has an upper valve seat 91 and a lower valve seat 92. A spherical dome shaped upper valve member 93, the center of curvature of which is designated as point X, cooperates on its interior surface with the valve seat 91. A lower valve member 94 has a lower face that is spherically curved about the center point X and is concentric with the interior surface of the valve member 93. The lower valve member 94 cooperates with the lower valve seat 92. The valve members 92 and 93 are rigidly connected together by a stem 95. The stem 95 may connect at its lower end to a valve actuating diaphragm, not shown. A spherical enlargement 96 is formed integrally with the stem 95. The enlargement 96 has a center of curvature which is the same as the center of curvature as the valve facings of valve members 93 and 94. The enlarged portion 96 of the valve stem 95 is confined slidably in a guide sleeve 97 which is secured to the valve web 90 by a spider 98. Inasmuch as the valve members 93 and 94 have concentrically spherically curved valve facings about the center point X, and the spherical enlargement 96 on the valve stem 95 also has the same center of curvature, any tilting of the valve will be confined about the center point X and will not vary the proper seating characteristics of the valve. Therefore, it is seen that a valve structure may be built in accordance with the teachings of my invention, wherein the center of curvature is located between the two valve members and the valve will still seat properly even though it may become tilted during its operation.

While I have shown some forms which my valve may take and have explained the principles thereof as applied to a gas valve, it will be clearly understood that these advantageous principles may be readily applied to other types of valves, or valves embodying more than two valve members, or that other modifications in structure will be made without departing from the spirit of the invention. Hence it is to be clearly understood that I am not to be limited in my invention only to that form disclosed but by the scope of the appended claims.

I claim as my invention:

1. In a balanced valve having a pair of spaced ports and a pair of valve members cooperable therewith to valve a fluid, the combination of, a first curved valve seat around one of said ports, the curve thereof being spherical about a center point, a second curved valve seat around the other of said ports, the curve thereof being spherical about substantially the same center point, and guide means to maintain said valve members rotatably about said center point in a predetermined relationship to said valve seats to insure proper seating by said members.

2. The combination in a valve, of a plurality of spaced concentrically spherically curved valve seats, a plurality of similarly spaced valve members cooperable with said seats to perform valving functions, and guide means to confine lateral movement of said members with respect to said seats substantially rotatably around the center of curvature of said seats.

3. In a valve, means forming a pair of spaced valve ports, a pair of concentrically spherically faced valve members cooperable with said ports, the center of curvature thereof being between said members, said valve members being movable toward and away from said ports, and guide means to maintain said valve members rotatably about said center point in a predetermined relationship to said valve ports to insure proper seating by said members.

4. In a balanced valve having a pair of spaced ports and a pair of valve members mounted on a valve stem in spaced relation with said ports and cooperable therewith to valve a fluid, the combination of, a first curved valve facing on one of said valves, the curve thereof being spherical about a center point, a second curved valve facing on the second of said valves, the curve thereof being spherical about substantially the same center point, said center point being on the same side of both valves, and guide means cooperating with the valve stem and being so formed as to permit only a limited lateral motion of the valve about approximately the center point.

5. In a balanced valve having a pair of spaced ports and a pair of valve members cooperable therewith to valve a fluid, the combination of, a first curved valve facing on one of said valves, the curve thereof being spherical about a center point, a second curved valve facing on the second of said valves, the curve thereof being spherical about substantially the same center point, said center point being between said valves, and guide means to maintain said valve members rotatably about said center point in a predetermined relationship to said valve ports to insure proper seating by said members.

6. The combination, with a balanced valve comprising a pair of spaced valve ports and a pair of valve members mounted on a valve stem in spaced relation with said ports and cooperable therewith, of means for obtaining proper simultaneous seating of said members upon said ports comprising a first spherically curved valve facing upon one of said valves, a second concentrically spherically curved valve facing upon the other of said valves, the center of curvature being on the same side of both valve members, and guide means cooperating with the valve stem and being so formed as to permit only a limited lateral motion of the valve about approximately the center point.

7. The combination in a valve, of a pair of spaced concentrically spherically curved valve seats, the center of curvature being on the same side of both of said seats, a plurality of similarly spaced valve members cooperable with said seats to perform valving functions, and guide means to confine lateral movement of said members with respect to said seats substantially rotatably around the center of curvature of said seats.

8. A balanced valve comprising in combination, a pair of valve seats, a pair of connected valves mounted for cooperation with said seats, the faces of said valves being spherically formed about substantially the same point, a valve stem for moving said valves between open and closed positions, and guide means located between said two valves for guiding their movement, said guide means being so formed as to permit limited rotation of said valves about said point.

9. A balanced valve comprising in combination, two pair of cooperating elements, the first of said pair comprising a pair of valve seats, the second of said pair comprising a pair of valve members mounted for cooperation with said seats, each element of one of said pair of elements presenting a spherical surface, said surfaces being spherical about substantially the same point, each element of the other pair of elements presenting a sharp annular surface for engagement with the corresponding spherical surface to form substantially a line contact, a valve stem for operating said valves between open and closed positions, and means for guiding said valves, said guiding means being so formed as to permit limited rotation of said valve members about said point.

10. A balanced valve comprising in combination, a pair of vertically spaced valve seats, a pair of connected valves mounted for cooperation with said seats, the faces of said valves being spherically formed about substantially the same point, a valve stem extending downwardly from said valve for engagement with an actuating member, and guide means cooperating with said stem above at least one of said valves for guiding them as they are moved by said valve stem, said guide means being so formed as to permit limited rotation of said valves about said point.

11. A balanced valve comprising in combination, two pair of cooperating elements, the first of said pair comprising a pair of vertically spaced valve seats, the second of said pair comprising a pair of valve members mounted for cooperation with said seats, each element of one of said pair of elements presenting a spherical surface, said surfaces being spherical about substantially the same point, each element of the other pair of elements presenting a sharp annular surface for engagement with the corresponding spherical surface to form substantially a line contact, a valve stem extending downwardly from said valves for engagement with an actuating member, and guide means cooperating with said stem above at least one of said valves for guiding them as they are moved by said valve stem, said guide means being so formed as to permit limited rotation of said valve members about said point.

12. In a balanced valve having a pair of spaced ports and a pair of valve members cooperable therewith to valve a fluid, the combination of, a first curved valve facing on one of said valves, the curve thereof being spherical about a center point, and a second curved valve facing on the second of said valves, the curve thereof being spherical about substantially the same center point, said center point being between said valves.

13. In a balanced valve having a pair of spaced ports and a pair of valve members cooperable therewith to valve a fluid and forming two groups of cooperable valve elements, at least one valve element of each of said two groups having a spherically curved face, the center of spherical curvature of the faces of all of said elements being the same and being located between said valve members, and guide means to maintain said valve members rotatably about said center point in a predetermined relationship to said valve ports to insure proper seating by said members.

MARVIN R. LAING.